United States Patent [19]
Karasaki

[11] Patent Number: 5,969,335
[45] Date of Patent: Oct. 19, 1999

[54] LASER CONTROL SYSTEM FOR USE IN LASER PROCESSING MACHINE UTILIZING LASER-INDUCED PLASMA DETECTING SYSTEM

[75] Inventor: Hidehiko Karasaki, Ashiya, Japan

[73] Assignee: Matsushita Electric Industrial Co., Ltd., Osaka-fu, Japan

[21] Appl. No.: 08/931,687

[22] Filed: Sep. 16, 1997

[30] Foreign Application Priority Data

Sep. 20, 1996 [JP] Japan ................................. 8-249453

[51] Int. Cl.$^6$ .............................. G01J 1/32; B32K 26/04
[52] U.S. Cl. ...................................... 250/205; 219/121.62
[58] Field of Search .................................. 250/205, 221;
219/121.6, 121.61, 121.62, 121.81, 121.36;
372/25, 38

[56] References Cited

U.S. PATENT DOCUMENTS 5,026,979   6/1991   Ortiz, Jr. et al. ........................ 250/205

*Primary Examiner*—Edward P. Westin
*Assistant Examiner*—Kevin Pyo
*Attorney, Agent, or Firm*—Greenblum & Bernstein, P.L.C.

[57] ABSTRACT

In a laser processing machine, a laser control system includes a photo detector (21) detecting intensity of light generated by laser-induced plasma produced by applying laser beams on an object, and a control unit (30) for controlling a laser pulse signal to have an optimum pulse width and optimum pulse period effective in each pulse signal based on the detection signal, so that the optimized laser pulse signal is obtained to thereby automatically control the generation of the laser beams, where the pulse width of each pulse is controlled by the control unit (30) so that the detection signal outputted from the photo detector (21) has its peak values to be all equal to a constant level (Vp), and the pulse period of each laser pulse signal is so controlled as to have a reference threshold level (Vr) which is previously given by the material of the object, and thus the total processing time in perforating process can be remarkably reduced.

7 Claims, 7 Drawing Sheets

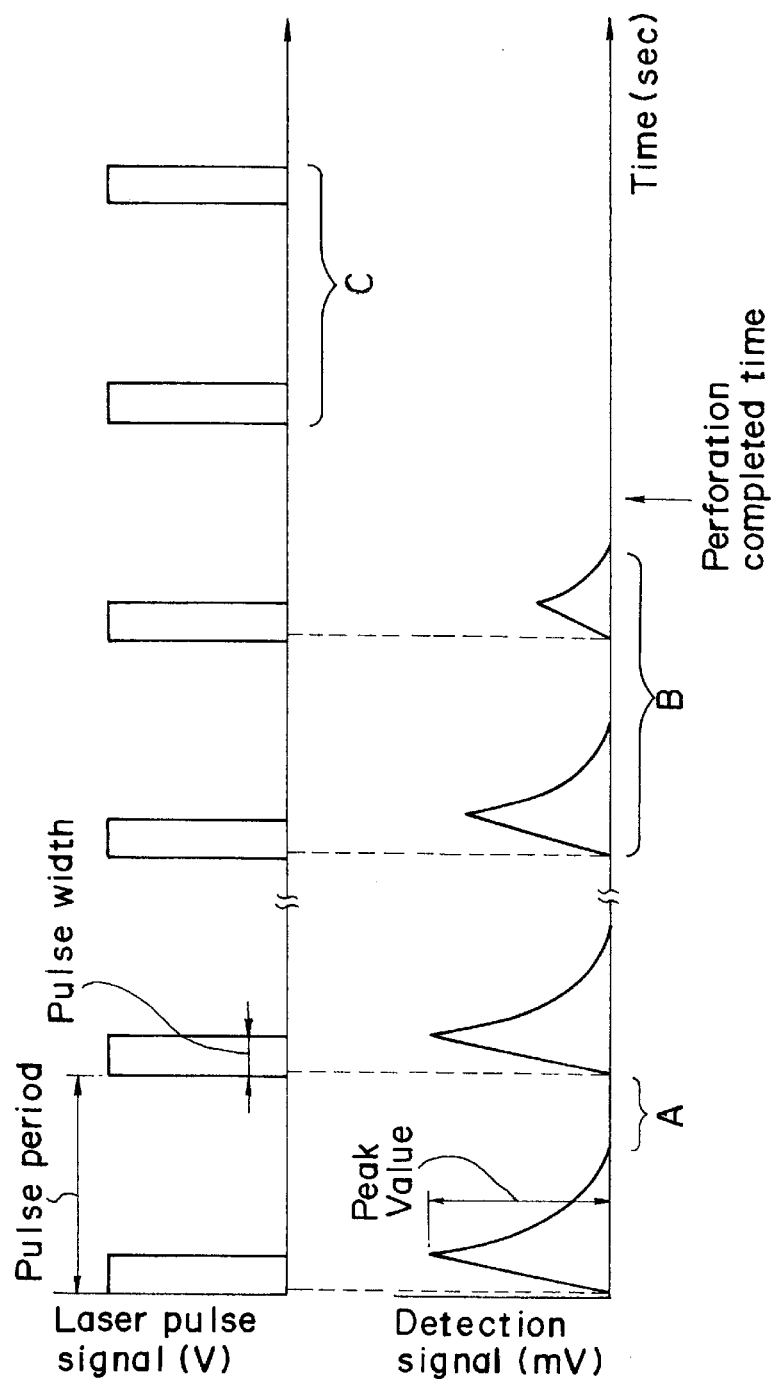

LASER CONTROL SYSTEM FOR USE IN LASER PROCESSING MACHINE UTILIZING LASER-INDUCED PLASMA DETECTING SYSTEM

BACKGROUND OF THE INVENTION

1. Field of the Invention

The present invention generally relates to a laser-induced plasma detecting system for use in a laser processing machine, and in particular to a laser control system utilizing a photo detector unit for detecting light of laser-induced plasma generated by application of laser beams on an object to be processed.

2. Description of the Prior Art

Conventionally, a laser processing machine has a torch unit 100 attached thereto for performing a laser beam machining process on an object to be processed as shown in FIG. 7. The torch unit is provided for the purpose of: i) obtaining a high energy density of laser beams required for processing the object by way of condensing the laser beams, and ii) obtaining assist gas flow to be projected onto a precise target position of the object.

In FIG. 7, the torch unit 100 includes a condenser lens 1 which is secured by a spacer ring member 2 disposed in close contact onto a spring ring member 3, where these members 1 through 3 are integrated and inserted in a lens holder tube 4, which is further secured by a lens securing ring 5. The lens holder tube 4 secured by the lens securing ring 5 is incorporated within a torch main body 6 of the torch unit 100 and securely fixed in position by a lens positioning ring 7.

The torch unit 100 further includes an assist gas inlet 15 and a nozzle attachment portion 101 which is attached to a torch end portion 8, where the nozzle attachment portion 101 is comprised of a nozzle 11 which is securely attached to a nozzle base portion 12, and a nozzle fixing member 9 which is securely positioned by a torch adjusting base plate 10 and fixed by a nozzle fixing ring 13 surrounding therearound.

In this construction, the nozzle base portion 12 is further mechanically engaged with the nozzle fixing member 9 by way of a screw cut means, where the positioning adjustment in a vertical axis direction of the nozzle is performed by adjusting the engagement between the nozzle fixing member 9 and the nozzle base portion 12 to thereby adjust the nozzle portion into a focus point for the laser beams.

In this arrangement, the nozzle attachment portion 101 is adjusted in position for centering alignment of the nozzle 11 by means of centering adjustment screw drivers 14 to obtain the alignment of the nozzle aperture with the laser beams passing therethrough. Thus, the torch unit 100 is adjusted in view of both the focus condition and the centering alignment with the laser beams.

In this construction of the conventional laser processing machine, particularly in a perforating process, the processing conditions are experientially selected in consideration of the conditions such as a pulse width, pulse period or frequency, processing time and processing speed recommended by makers without detecting laser-induced plasma (referred to as "LIP", hereinafter). It is noted here that the term "laser-induced plasma (LIP)" refers to a plasma phenomenon induced with evaporated gaseous materials of an object when applying laser beams onto the object to be processed. The LIP plays an important part of perforating, welding and like processes in laser beam machining.

However, in this conventional processing method, the laser beam machining process is not optimized with regard to the processing time because of employing the experientially decided conditions for the processing. In order to obtain the optimum conditions for performing the laser beam machining, not only elucidation but also detection of the process of the laser beam machining must be taken into account, and also it is required to judge the detection results of the processing phenomenon of the laser beam machining to control the laser beams based on the detection results.

In particular, when carrying out a perforating process on a mild steel plate having a thickness of, for example, 12 mm or more, it takes a long processing time to complete the perforation, and there arises a problem that a total processing time of the laser beam machining is undesirably increased especially when the laser beam machining process includes a lot of perforating steps.

FIGS. 8A and 8B shows a laser pulse signal for commanding generation of laser beams in connection with a detection signal of the laser-induced plasma LIP. In the conventional laser processing machine, as shown in FIGS. 8A and 8B, the detection signal is obtained by using a photo detector unit (not shown) for an experimental purpose to detect the intensity of the LIP although such a photo detector is not used in the practical conventional laser processing machine. In this experiment, a photoelectric photometer, light-flux meter and the like light-intensity meter may be used as the photo detector unit.

In this experiment, with regard to the conventional processing conditions experientially decided and recommended by makers, the pulse width of each pulse and the pulse period (i.e., pulse frequency) are both fixed. In a practical perforating process for a mild steel plate of 12 mm thick or more, whole processes are divided into two or three steps and the optimum conditions are decided in each divided step. However, the processing conditions are not optimized for each laser pulse in any process in the conventional method.

In this experiment, as shown in FIG. 8B, the peak values of the detection resultant signal are attenuated with time lapse. This is because the quantity of the detected light of the LIP is decreased as the perforation process proceeds in depthwise in the steel generated LIP is partially maintained in the perforated hole in the steel plate and the LIP part staying in the hole is not detected by the light detection unit.

In this experiment of the conventional process, there arise mainly three problems with regard to processing time under the processing conditions particularly in a perforating process by a laser processing machine.

As a first problem, each pulse period of the laser pulse signal is fixed longer than the period of life of each detection signal of the LIP, resulting in a drawback of increasing the redundant processing time as shown by a portion A in FIG. 8B.

Moreover, there is another problem that, as shown by a portion B in the figure, the processing conditions are not taken to cope with the deterioration in perforating property as the detection light quantity of the LIP is decreased with time lapse.

There is further another problem that, as shown by a portion C in FIG. 8A, the laser beam machining is still maintained for additional coverage for absorbing differences in process after completion of the perforation.

SUMMARY OF THE INVENTION

Accordingly, in view of the above-described problems, the present inventor has studied specific mutual relations when performing a laser beam machining process.

Thus, an essential objective of the present invention is to provide an improved laser-induced plasma detecting system.

Another objective of the present invention is to provide a laser control system for use in a laser processing machine.

Further another objective of the present invention is to provide an improved laser processing machine.

In order to achieve the objectives mentioned above, according to the first aspect of the present invention, a laser-induced plasma detecting system for use in a laser processing machine having a torch unit for adjusting focus condition and centering alignment with laser beams to be projected to an object, comprises: at least one photo detector for detecting intensity of light generated by laser-induced plasma produced by applying laser beams on the object, which includes: an optical lens for restricting a detection range of a field vision of the laser-induced plasma, a diffraction grating for selectively passing at least two light rays having different specific wavelengths in spectrum of the light emitted from the laser-induced plasma, a photoelectric convertor for converting an input light signal into an electric signal where the electric signal is transmitted to a pre-amplifier by way of a signal connector, thereby obtaining an electric detection signal of the light emitted from the laser-induced plasma, wherein the selected wavelengths through the diffraction grating are specific to a material of the object to thereby obtain the detection signal which corresponds to the intensity of the light according to the laser beam application.

Moreover, according to the second aspect of the present invention, a laser control system for use in a laser processing machine, comprises: a photo detector detecting intensity of light generated by laser-induced plasma produced by applying laser beams on an object and generating a resultant detection signal of the light; and a control unit electrically connected to said photo detector for controlling a laser pulse signal for commanding generation of the laser beams to have an optimum pulse width and optimum pulse period effective in each pulse signal based on the detection signal, so that the optimized laser pulse signal is transmitted to a laser beam generator to automatically control the generation of the laser beams, wherein the pulse width of each pulse is controlled by the control unit so that the detection signal outputted from the photo detector has its peak values to be all equal to a constant level, and wherein the pulse period of each laser pulse signal is so controlled as to have a reference threshold level which is previously given by the material of the object.

By this arrangement, the processing condition of the laser beam application can be optimized even when the perforating performance is reduced in the process because of the proceeding in depthwise in a hole. Moreover, the laser pulse signal can be optimized based on the condition of the surface state of the object and the condition of the assist gas flow in each pulse.

Thus, by the optimum control of the laser pulse signal in each pulse, the pulse period corresponds to the life of each duration of LIP, eliminating prolonged time, attaining the possibly smallest pulse period.

Furthermore, when the detection signal level is reduced to be zero level, it is judged that the perforating process is completed and the laser beam generation is stopped to terminate the further redundant perforating process.

Accordingly, the total processing time in a laser beam process can be remarkably reduced in the present invention with respect to various thickness of e.g. mild steel plate as an object to be process compared to the conventional method to thereby improving the productivity advantageously.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 8A and 8B are timing charts showing laser pulse signals and LIP detection signals in the conventional processing conditions.

DETAILED DESCRIPTION OF THE PREFERRED EMBODIMENTS

Figure 1:
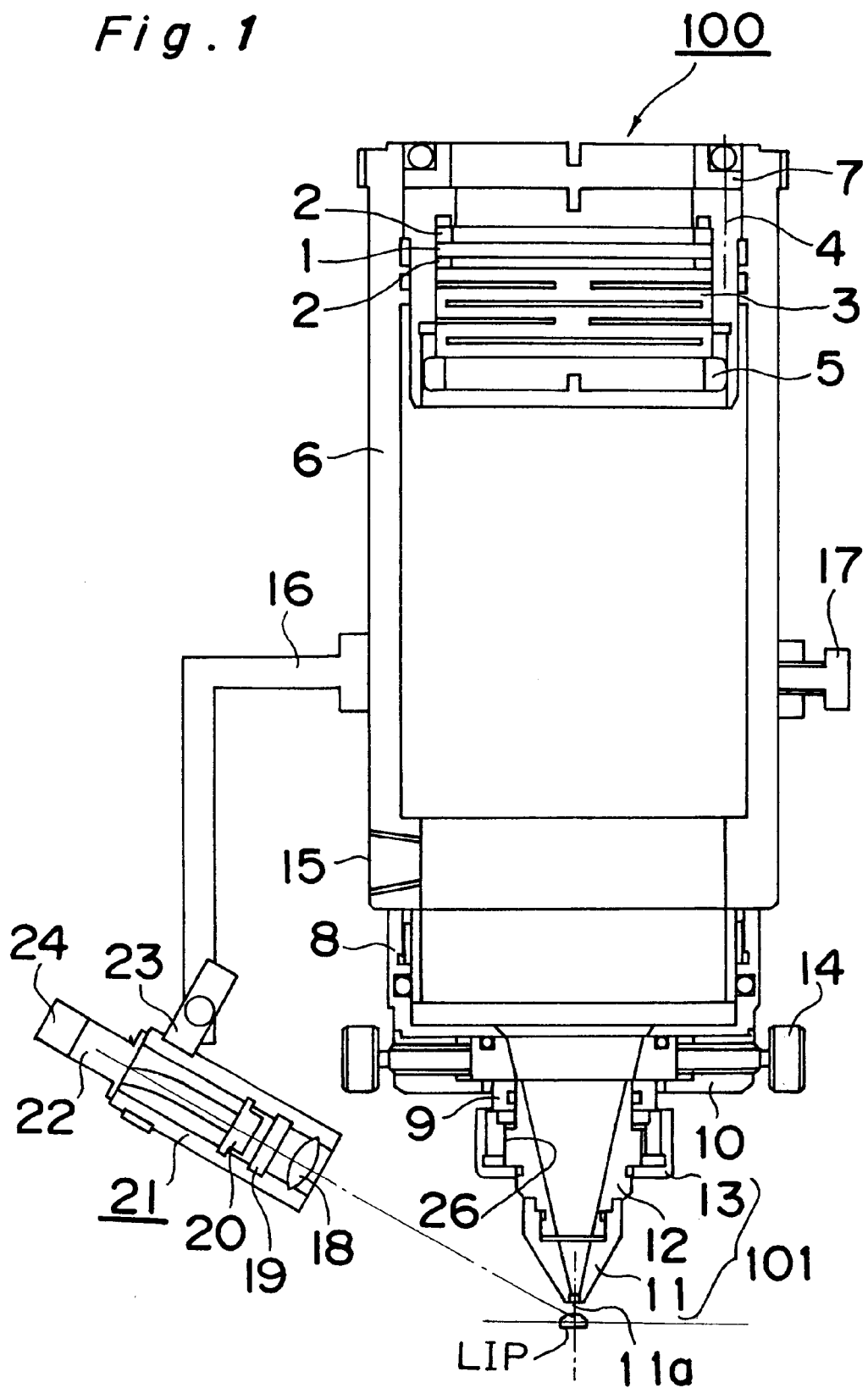
FIG. 1 is a sectional view showing a construction of a torch unit including a photo detector according to an embodiment of the present invention.

Before the description proceeds, it is noted that, since the basic structure of the laser processing machine of the present embodiment is the same as that of the conventional one, like parts are designated by like reference numerals throughout the drawings.

The following describes a preferred embodiment of the present invention with reference to FIGS. 1 through 6.

Figure 7:
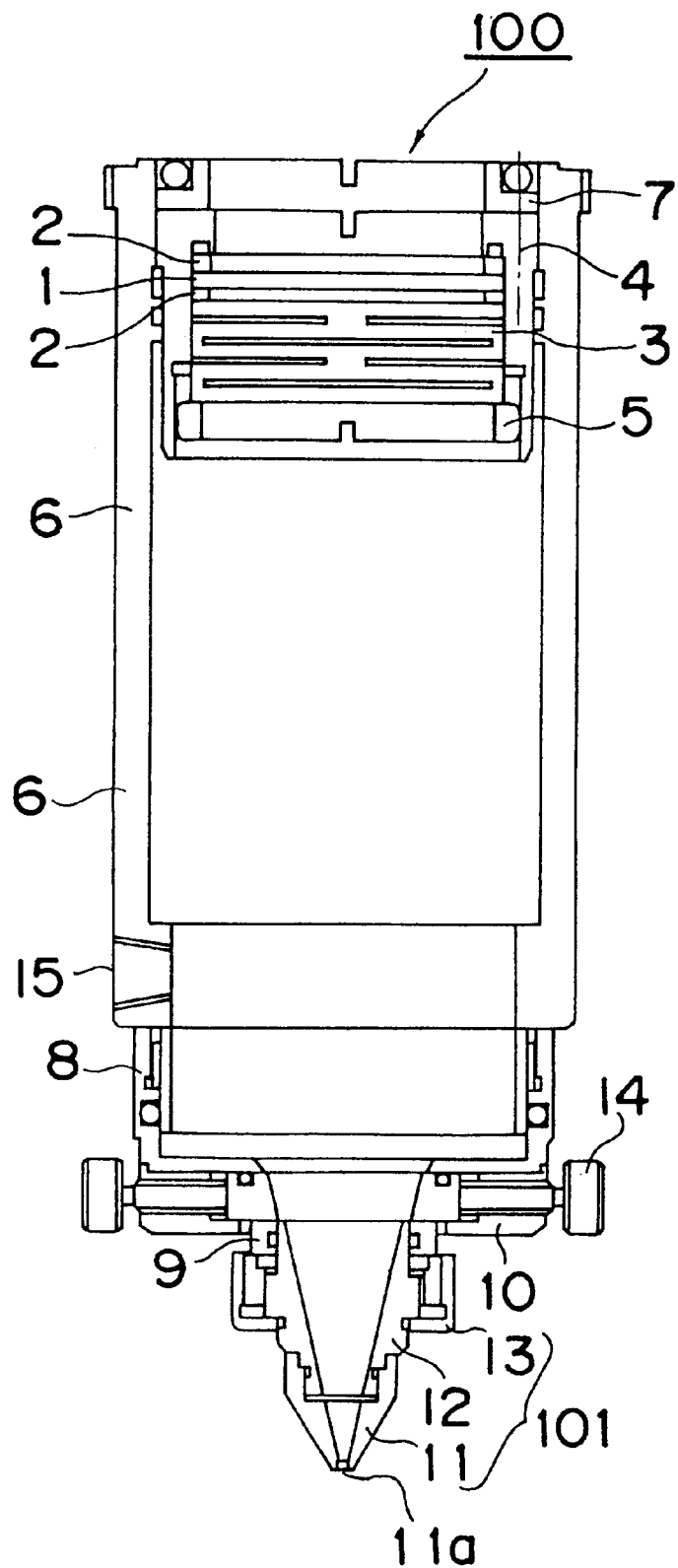
FIG. 7 is a sectional view showing a construction of a conventional torch unit.

FIG. 1 shows a schematic construction of a torch unit for use in a laser processing machine of the present embodiment which is similar to that of the conventional one shown in FIG. 7 except for providing one or more photo detectors (21).

In the laser processing machine, there is provided a torch unit 100 serving as a processing blowpipe attached thereto for performing a laser beam machining on an object to be processed.

In FIG. 1, the torch unit 100 includes a condenser lens 1 for condensing the laser beams supplied from a laser beam generator (50), where the condenser lens is secured by a spacer ring member 2 which is disposed in close contact onto a spring ring member 3, where these members 1 through 3 are integrated and inserted in a lens holder tube 4 which is secured by a lens securing ring 5 to form a beam condensing assembly. The beam condensing assembly having the lens holder tube 4 secured by the lens securing ring 5 is incorporated within a tubular torch main body 6 of the torch unit 100 and securely fixed in position by a lens positioning ring 7.

The torch unit 100 further includes an assist gas inlet 15 defined in the torch main body 6 and a nozzle attachment portion 101 which is attached to a torch end portion 8 located below the assist gas inlet 15 as depicted in the figure.

The nozzle attachment portion 101 is comprised of a nozzle 11 which is securely attached to a nozzle base portion 12, and a nozzle fixing member 9 which is securely positioned by a torch adjusting base plate 10 and fixed by a nozzle fixing ring 13 surrounding therearound. In this construction, the nozzle base portion 12 is further mechanically engaged with the nozzle fixing member 9, where the positioning adjustment in a vertical axis direction of the nozzle is performed by adjustable engagement between the nozzle fixing member 9 and the nozzle base portion 12 by forming a screw cut interface 26 therebetween. Thus, the adjustment of the nozzle position performed in focus point for the laser beams onto a precise target position, obtaining an appropriate high energy density of the laser beams on the target object.

In this arrangement, the nozzle attachment portion 101 is adjusted in position for centering alignment of a tip aperture 11a of the nozzle 11 by means of centering adjustment screw drivers 14 to realize the alignment of the nozzle aperture with the laser beams passing therethrough.

Thus, the torch unit 100 adjusted in view of both focus condition and centering alignment of the nozzle with the laser beams is attached to the laser processing machine, and the aperture 11a of the nozzle 11 is so adjusted in diameter as to obtain a uniform assist gas flow to be projected onto a processing target portion of the object.

In this arrangement, one or more photo detectors 21 are further attached to the torch unit 100 in the laser processing machine. In this embodiment, for an easy explanation, a case of providing a single photo detector 21 on the torch unit 100 is explained.

The photo detector 21 is fixed to the torch main body 6 with an inclination angle by means of a holding arm 16 and secured thereto by a stopper mechanism 17. The inclination angle of the photo detector 21 is adjusted by an angle adjusting portion 23 of the holding arm 16 so that the photo detector is directed to a LIP portion generated on a processed portion of an object, which is located just below the tip aperture 11a by an appropriate distance of several millimeters.

The photo detector 21 includes an optical lens 18 for restricting a detection range of a field vision of LIP, and a diffraction grating 19 for selectively passing at least two light rays having different specific wavelengths emitted from the LIP, where the selection of the wavelengths is performed by way of scanning a wavelength window of the grating. The photo detector 21 further includes a photoelectric convertor 20 for converting an input light signal into an electric signal where the electric signal is transmitted to a pre-amplifier 24 by way of a signal connector 22, thereby obtaining an electric detection signal of the light emitted from the LIP.

By this construction, the light of the LIP generated on a precise position on the object is effectively selected in wavelength where the selected wavelengths are specific to the material of the object to thereby obtain a detection signal which indicates a pure intensity of the light according to the laser beam application. Then the resultant detection signal is transmitted to a laser control unit 30 as to be described later with reference to FIG. 3.

Figure 2:
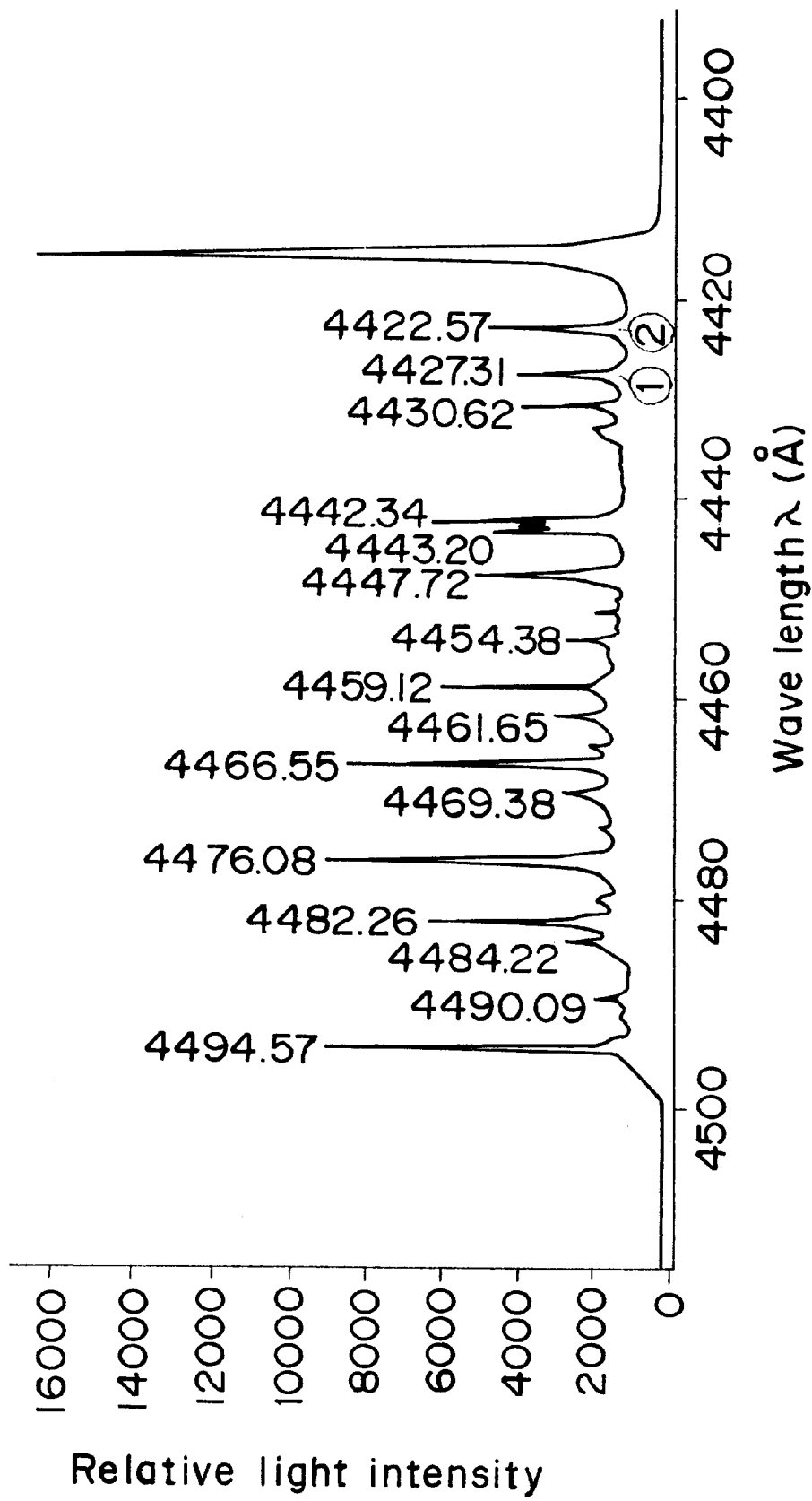
FIG. 2 is a graph showing an example of a luminous spectrum of a light generated by a plasma caused by laser beam application on a mild steel.

FIG. 2 shows an experimental example of a luminous spectrum of a light generated from LIP when laser beams are applied to an object of mild steel plate, where the luminous spectrum is obtained by directly measuring the light intensity of the LIP using, e.g., a spectro-photometer (not shown).

In FIG. 2, the abscissa axis represents a wavelength of each spectrum of the light generated by the LIP, while the ordinate axis represents the relative intensity of the light of each wavelength. In this spectrum, two peak values indicated by marks "1" and "2" are appearances specific to a material of iron element of the object which the specific peak values are clearly distinguished from the other peak values caused by other factors in the spectrum of the LIP. Thus, the specific peak values in wavelength are selectively detected among the spectrum of the LIP through the diffraction grating 19 in the photo detector 21 to thereby obtain a pure intensity of the light based on the laser process effected on the object.

In the meanwhile, since the intensity of the light generated by the LIP is very strong, the field range of vision to be detected by the photoelectric converter 20 in the photo detector 21 must be restricted in order to obtain an electrical detection signal having a sufficient S/N ratio.

However, there may be a case where peak values specific to an object to be processed appear in close near to a visible range of light or have a low level relative to the other peak values caused by the other factors as shown by an example of an iron element of the object. In this case, since it is difficult to obtain a sufficient S/N ratio of the detection signal by a single photo detector, therefore a plurality of peak values of light rays are simultaneously detected by providing a plurality of photo detectors to obtain a comparison ratio of the different two peak values in a field range of vision including not only visible range but also infrared and ultraviolet ranges in wavelength, thereby discriminating the pure detection signal separated from disturbance rays in the LIP.

Moreover, in this arrangement, the circuitry including the photo-electric converter 20 and pre-amplifier 24 of the photo detector 21 has a time constant which is preferably nearly equal to or larger than 10 $\mu$sec. This is because it becomes difficult to distinguish from noises the detection signals varying in repetition in a short time period when the time constant is smaller than 10 $\mu$sec. In the case where a wavelength window of the diffraction grating 19 is scanned in order to detect a plurality of peak values of specific wavelengths in the luminous spectrum, the scanning speed is so controlled and suppressed taking account of the time constant of the circuitry as to obtain a sufficient S/N ratio of the detection signal.

In the preferred embodiment, the wavelength window of the diffraction grating 19 is nearly equal to or larger than 2 Å. In the meantime, when the wavelength window of the grating is smaller than 2 Å, a sufficient S/N ratio of the detection signal can not be obtained. This is because the light having the peak value "1" in this example shown in FIG. 2 is spaced by at least 3 Å in wavelength from the adjacent peak value. In this construction, the intensity of the detection signal is in proportion to an area within each peak value of the graph, and therefore the resolution thereof can not be made too high and should be restricted within a given range in order to obtain a sufficient S/N ratio of the detection signal.

The following describes a principle of a laser control operation in accordance with detection of a phenomenon of LIP as it is necessary to consider its nature and behavior in order to obtain a comprehensive physical feature of LIP.

As described above, the LIP is generated upon application of laser beams onto a target portion of an object to be processed. In the first step, when the laser beams are applied to the object to be processed, the materials of the object are partially evaporated into atomic state, which the evaporated atomic particles further receive energy from the subsequently applied laser beams so that the evaporated atomic particles are converted into highly ionized gaseous status composed of free electrons, ions and neutral particles to thereby produce the LIP. The atomic particles of the plasma state collide with neighborhood atomic particles to receive electrons, so that the excited state of the plasma is transferred to the ground state. In this transition, light rays are generated from the LIP after a little time lapse from the application of the laser beams, and thus the light generated from the LIP has a constant spectrum.

In other words, the light emission from the LIP is caused in such a manner that a part of the subsequently applied laser beams is absorbed by the previously produced LIP and the energy of the absorbed laser beams is re-discharged as a light emission. Therefore, the emitted light is largely influenced by deflection of the plasma in spatial and time aspects, so that the intensity of the emission light is rapidly varied at a high speed in time aspect and also a light emission of high intensity is obtained in spatial aspect from a limited area of the LIP through which the laser beams are passed.

The laser beams are generally condensed to have a diameter of 0.3 mm or smaller around a focal position, and therefore the detection field range of vision by the photo detector is preferably within a given area of 1 mm or smaller in diameter even in consideration of dispersion of the laser beams in the plasma. On the contrary, when the detection area is increased beyond the above given area, the S/N ratio of the detection signal is deteriorated, and therefore it is desirable that the detection area is as small as possible.

Figure 3:
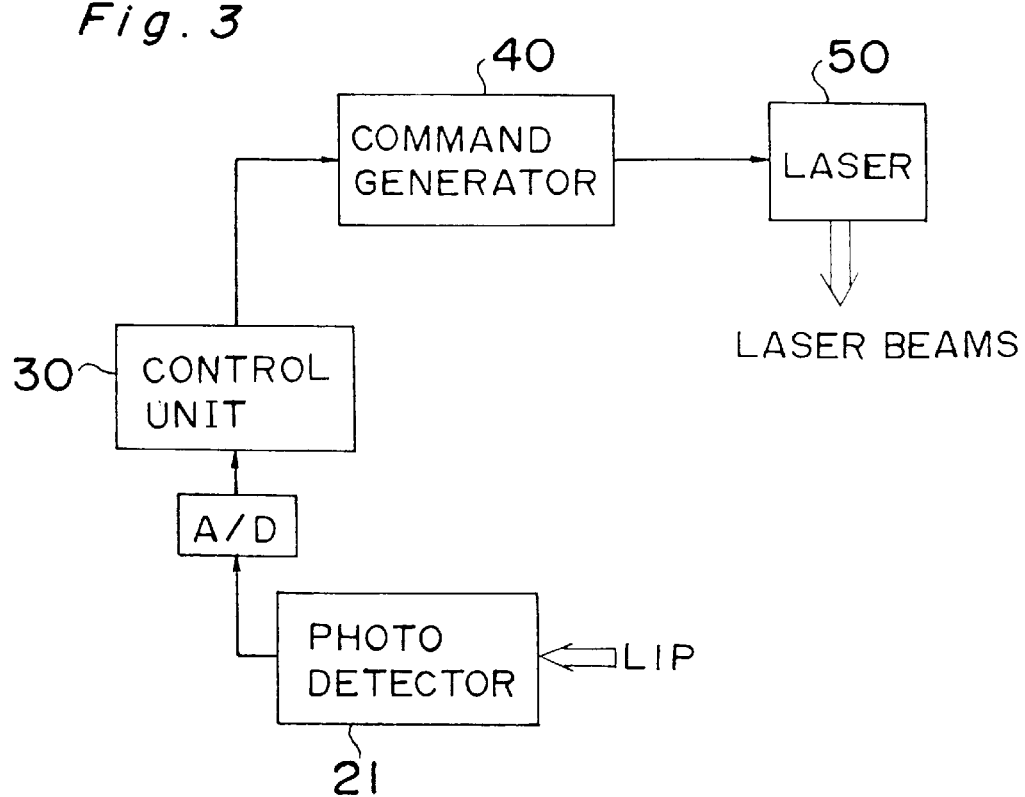
FIG. 3 is a block diagram showing a schematic construction of a laser control system according to the present invention.

In a laser control system shown in FIG. 3, the detection signal Sdet obtained by the photo detector 21 is transmitted to the laser control unit 30 by way of an A/D converter. In the laser control unit 30, there is generated a control signal Scnt for controlling a laser pulse signal for commanding the generation of the laser beams to have an optimum pulse width and optimum pulse period or frequency effective in each pulse signal based on the detection signal, and then the optimized laser pulse signal is transmitted to a laser beam generator 50 by way of a command generator unit 40 commanding to generate an optimized laser beams in intensity and period thereof.

Figure 4A:
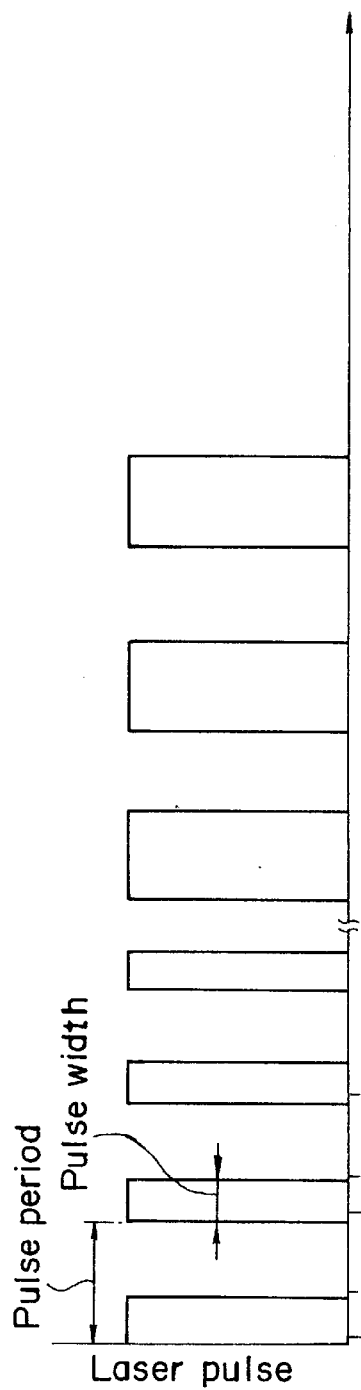
FIGS. 4A, 4B and 4C are timing charts showing laser pulse signals; and LIP detection signals according to an embodiment of the present invention.
Figure 4B:
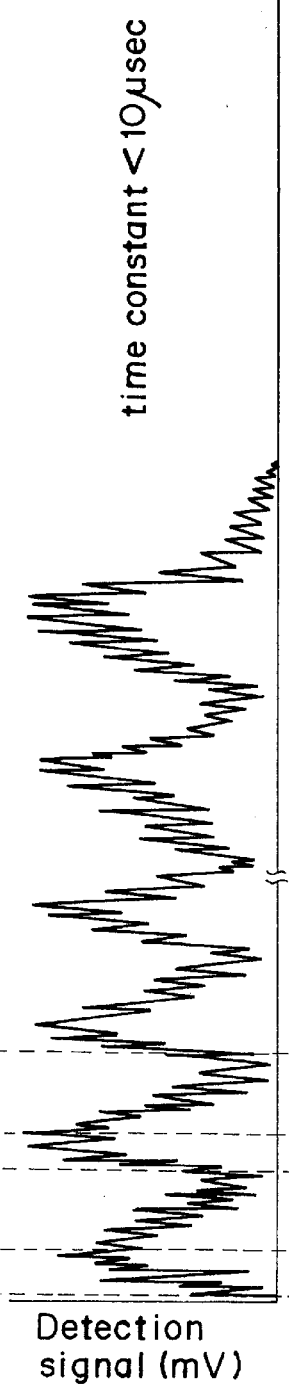
Figure 4C:
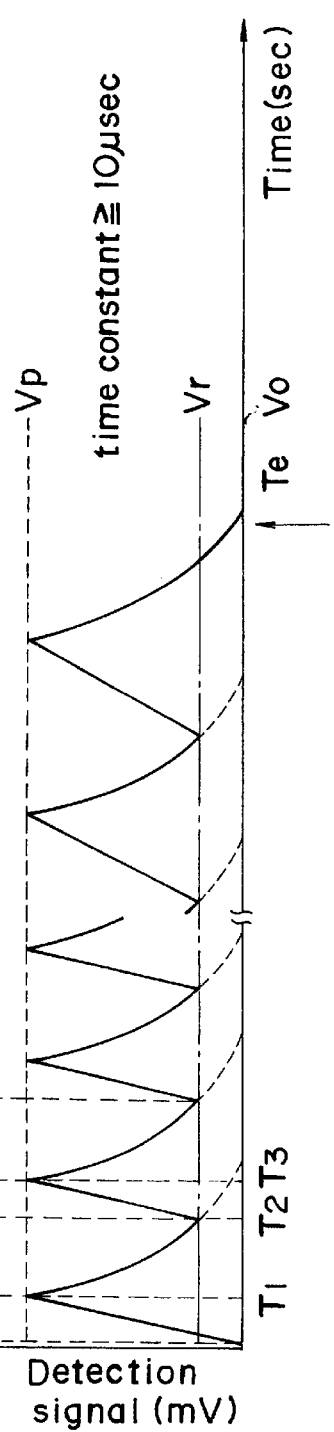

FIGS. 4A, 4B and 4C show examples of detection signals outputted from the photo detector 21 in connection with the laser pulse signal commanding the generation of the laser beams comparing two examples of the circuitry of the photo detector 21 having different time constants.

In this control system, when the time constant of the circuitry of the photo detector 21 is smaller than 10 $\mu$sec, it is impossible to discriminate from noises the detection signal varying in repetition in a short time as shown in FIG. 4B where a stable judgment with respect to a reference threshold can not be obtained. Therefore, in the preferred embodiment, the circuitry of the photo detector has a time constant slightly larger than 10 $\mu$sec as shown in FIG. 4C where the detection signals evenly stabilized, obtaining the desirable S/N ratio which can be used judgment of the reference threshold.

In FIG. 4C, the detection signal outputted from the photo detector 21 is controlled by the control unit 30 to have its peak values to be all equal to a constant intensity (Vp) of which the peak level Vp is represented by a broken line while a reference threshold level Vr is represented by a one-dotted chain line which the reference threshold level Vr is previously given by the material of the object, and a zero level is represented by Vo at which no detection signal is inputted.

As described above, LIP has a nature of appearing as a black body state absorbing laser beams when the density of the LIP is increased to some extent, and in this black body condition the subsequently applied laser beams are dispersed and absorbed by the plasma, so that the energy of the laser beams in concentration can not be supplied to a target position of an object, resulting in deterioration of efficiency in a perforating process. At this black body state of the plasma density for the laser beams, the detection signal outputted from the photo detector 21 is remarkably reduced because of reduction in quantity of the detection light. Therefore, the peak level Vp of each detection signal in FIG. 4C should be fixed before the black body state appears in the plasma density in each period.

In the meanwhile, LIP has a nature in plasma density that appears as a transparent or permissible state at which laser beams are substantially permissible through the LIP when the density of the LIP is reduced to some extent of a given low level. The permissible state in plasma density for the laser beams appears before the LIP is reduced to be zero in density.

Accordingly, when the detection signal outputted from the photo detector 21 is beyond the peak value Vp in each period, the plasma density of the LIP is excessively high and the efficiency in perforating process is deteriorated because of the generation of the black body state. In this state, further subsequent application of laser beams to an object does more harm than good from the viewpoint of cooling the LIP. In view of the above, the quantity of the laser beam application should be so controlled by adjusting the pulse width of each laser pulse signal as to have the highest efficiency in perforating process. In other words, the pulse width of each laser pulse signal is so controlled as to adjust the plasma density of the LIP fixed to a level just before the black body level for the laser beams so that the peak values of the detection signals are set at a constant level Vp, thereby obtaining the automatic control of the optimum laser pulse width.

Moreover, the pulse period or frequency of each laser pulse signal is so controlled as to have a period such that, when the plasma density is lowered to the permissible level for the laser beams, i.e., when the detection signal level is reduced to be equal to the reference threshold level Vr, the subsequent laser pulse is generated. When the detection signal level is reduced to be zero level Vo at time Te as shown in FIG. 4C, it is judged that the perforating process is completed and the subsequent laser pulse generation is stopped.

Figure 5:
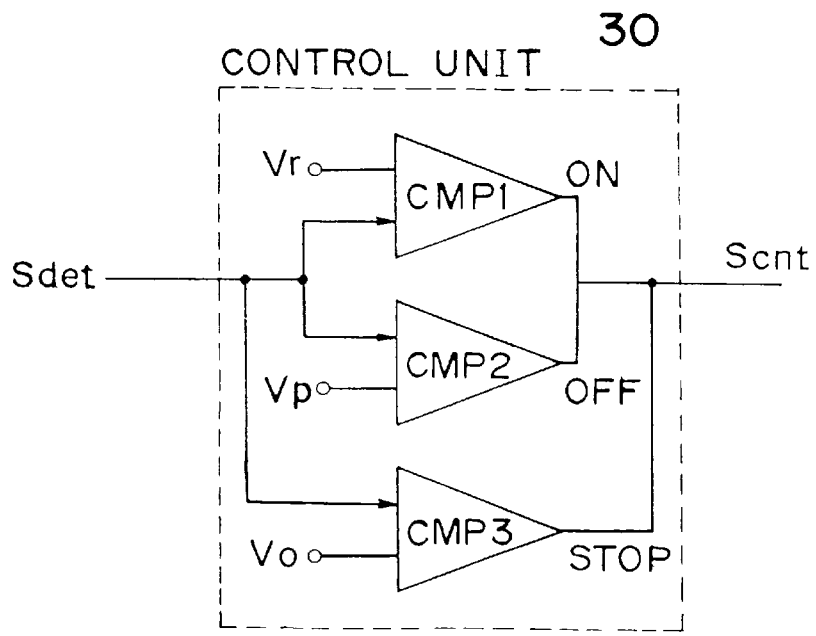
FIG. 5 is a schematic construction of a laser control unit.

As shown in FIG. 5, the control unit 30 includes a first judging unit CMP1 having a first reference level equal to the threshold level Vr, a second judging unit CMP2 having a second reference level equal to the constant peak value Vp, and a third judging unit CMP3 having a third reference level equal to the zero level Vo. In this arrangement, when the peak value Vp of the detection signal (Sdet) is detected e.g. at time T1 in the first period in FIG. 4C, OFF signal is generated by the second judging unit CMP2 so that the laser pulse signal is cut off to thereby stop the laser beam generation. When the detection signal level is reduced to be equal to the reference threshold level Vr e.g. at time T2, ON signal is generated by the first judging unit CMP1 so that the subsequent laser pulse signal is generated, in which the pulse generation is maintained till the level of the detection signal reaches to the next peak value Vp at time T3 in the second period.

By this arrangement, the processing condition of the laser beam application can be optimized even when the perforating performance is reduced in the process because of the proceeding in depthwise in a hole. Moreover, the laser pulse signal can be optimized based on the condition of the surface state of the object and the condition of the assist gas flow in each pulse, eliminating the conventional problem shown by the portion "B" in FIG. 8B.

Thus, by the optimum control of the laser pulse signal in each pulse, the pulse period corresponds to the life of each duration of LIP, eliminating prolonged time portion "A" as shown in FIG. 8B, attaining the possibly smallest pulse period.

Furthermore, when the detection signal level is reduced to be zero level Vo at time Te as shown in FIG. 4C, it is judged by the third judging unit CMP3 that the perforating process is completed at the time Te and the laser beam generation is stopped to terminate the further redundant perforating process, eliminating the conventional problem shown by the portion "C" in FIG. 8A.

It is to be noted that, although the optimum laser control in the laser beam machining is accomplished by a circuit construction in the embodiment as shown in FIGS. 3 and 5, such an automatic laser control can be, of course, realized by programming in a microcomputer.

Figure 6:
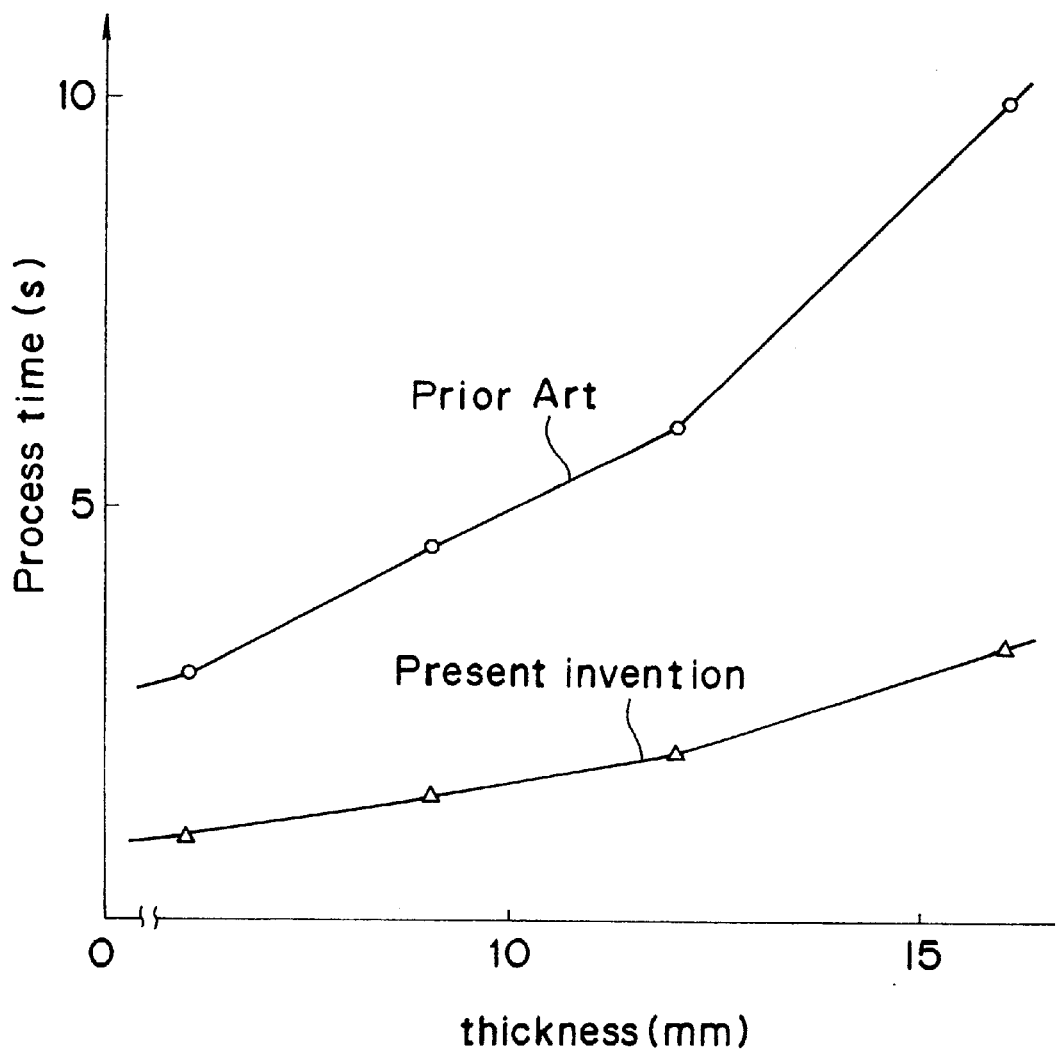
FIG. 6 is a graph comparing a processing time by a method of the present invention with that of the prior art.

FIG. 6 shows a graph of a perforating processing time comparing between the present embodiment employing the photo detector unit to select the optimum laser beam machining conditions with the conventional case, where mild steel plate of various thickness is used as an object to be processed for perforation.

As shown in this graph, the total processing time in perforating process can be remarkably reduced in the present embodiment with respect to various thickness of e.g., mild steel plate as an object to be process compared to the conventional method to thereby improve the productivity advantageously.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A laser control system for use in a laser processing machine, comprising:

a photo detector detecting intensity of light generated by laser-induced plasma produced by applying laser beams on an object and generating a resultant detection signal of the light; and a control unit electrically connected to said photo detector for controlling a laser pulse signal for commanding generation of the laser beams to have an optimum pulse width and optimum pulse period effective in each pulse signal based on the detection signal, so that the optimized laser pulse signal is transmitted to a laser beam generator to automatically control the generation of the laser beams, wherein the pulse width of each pulse is controlled by the control unit so that the detection signal outputted from the photo detector has its peak values to be all equal to a constant level, and wherein the pulse period of each laser pulse signal is so controlled as to have a reference threshold level which is previously given by the material of the object.

2. The laser control system as claimed in claim 1, wherein, by controlling the pulse width of each laser pulse signal, the plasma density of the laser-induced plasma is fixed to a level just before a black body level for the laser beams so that the peak values of the detection signals are set at the constant level, thereby obtaining the automatic control of the optimum laser pulse width.

3. The laser control system as claimed in claim 1, wherein the reference threshold level is a permissible level of plasma density for the laser beams, and when the detection signal level is reduced to be equal to the reference threshold level, the subsequent laser pulse is generated.

4. The laser control system as claimed in claim 1, wherein, when the detection signal level is reduced to be zero level, it is judged that the laser beam machining process is completed and the subsequent laser pulse generation is stopped.

5. The laser control system as claimed in claim 1, wherein said control unit includes a peak level judgment unit, and when the peak value of the detection signal is detected in a pulse period, the laser pulse signal is cut off to thereby stop the laser beam generation.

6. A laser processing machine having a torch unit for adjusting focus condition and centering alignment with laser beams to be projected to an object, comprising:

a photo detector detecting intensity of light generated by laser-induced plasma produced by applying laser beams on an object and generating a resultant detection signal of the light; and a control unit electrically connected to said photo detector for controlling a laser pulse signal for commanding generation of the laser beams to have an optimum pulse width and optimum pulse period effective in each pulse signal based on the detection signal, so that the optimized laser pulse signal is transmitted to a laser beam generator to automatically control the generation of the laser beams, wherein the pulse width of each pulse is controlled by the control unit so that the detection signal outputted from the photo detector has its peak values to be all equal to a constant level, and wherein the pulse period of each laser pulse signal is so controlled as to have a reference threshold level which is previously given by the material of the object.

7. A laser control method adapted in a laser beam machining process, comprising the steps of:

detecting intensity of light generated by laser-induced plasma produced by applying laser beams on an object and generating a resultant detection signal of the light; and controlling a laser pulse signal for commanding generation of the laser beams to have an optimum pulse width and optimum pulse period effective in each pulse signal based on the detection signal, and then automatically control the generation of the laser beams, wherein the pulse width of each pulse is controlled so that the detection signal has its peak values to be all equal to a constant level, and wherein the pulse period of each laser pulse signal is so controlled as to have a reference threshold level which is previously given by the material of the object.

* * * * *